United States Patent [19]
Sodenberg et al.

[11] Patent Number: 5,339,386
[45] Date of Patent: Aug. 16, 1994

[54] VOLUMETRIC EFFECTS PIXEL PROCESSING

[75] Inventors: Brian T. Sodenberg, Woodinville; Mark L. Kenworthy, Renton, both of Wash.

[73] Assignee: Bolt Beranek and Newman Inc., Cambridge, Mass.

[21] Appl. No.: 741,996

[22] Filed: Aug. 8, 1991

[51] Int. Cl.$^5$ .................. G06F 15/72; G06F 15/62
[52] U.S. Cl. ...................... 395/122; 395/121; 395/135; 395/120
[58] Field of Search ............... 395/122, 124, 126, 135, 395/121, 127, 120, 122, 121; 340/729

[56] References Cited

U.S. PATENT DOCUMENTS

| | | | |
|---|---|---|---|
| 4,679,040 | 7/1987 | Yan | 340/729 X |
| 4,684,990 | 8/1987 | Oxley | 395/121 X |
| 4,821,210 | 4/1989 | Rumbaugh | 395/121 |
| 4,835,712 | 5/1989 | Drebin et al. | 395/124 X |
| 4,918,625 | 4/1990 | Yan | 340/729 X |
| 4,992,780 | 2/1991 | Penna et al. | 395/122 X |
| 5,123,085 | 6/1992 | Wells et al. | 395/121 |

OTHER PUBLICATIONS

Turner Whitted–"Processing Requirements For Hidden Surface Elimination And Realistic Shading"–Digest of Papers Spring Compcon '82 22–Feb., 1982, New York, U.S.–pp. 245-250.

A. Mammen–"Transparency and Antialiasing Algorithms Implemented With the Virtual Pixel Maps Technique"–IEEE Computer Graphics And Applications, vol. 9, No. 4, Jul. 1989, New York, US–pp. 43-55.

*Primary Examiner*—Raymond J. Bayerl
*Attorney, Agent, or Firm*—Henry D. Pahl, Jr.

[57] ABSTRACT

In a real time image generation system opaque or planar object pixels are defined by at least a color attribute and a depth value and volumetric pixels are defined by at least a color attribute, a depth value and an opacity gradient value. A volumetric data buffer is provided for storing attributes and values associated with volumetric pixels and the volumetric items are processed first to load that buffer. Successive object pixel definitions are then read and the depth value of each current object pixel definition is compared with the depth value in the buffer and a relative weight for the volumetric effect is calculated as a function of the relative depth values and the corresponding volume gradient value. The color attributes of the object pixel and the volumetric data are then mixed as a function of the relative weighting to obtain a result color attribute which is output as the color for the respective pixel.

8 Claims, 11 Drawing Sheets

VOLUMETRIC EFFECTS PIXEL PROCESSING

BACKGROUND OF THE INVENTION

The present invention relates to real time image generation systems of the type used in simulation and interactive training and relates more particularly to a method for displaying volumetric effects such as smoke, fog and bomb bursts.

In real time image generation systems, it is typically necessary to completely build a new image during each frame interval, e.g. one fifteenth second or less, since such systems preferably permit the free changing of viewpoint in a three-dimensional world and the free changing of the position and orientation of various objects which can be seen from the viewpoint. Real time image generation systems typically operate from a database providing an inventory of objects which can be displayed. The data typically represents each object as a group of three-dimensional polygons of arbitrary sizes which can then be positioned, scaled and rotated or oriented by applying mathematical transforms. The polygons may, for example, be represented by the locations of vertices. Typically, there is associated with each surface of the polygon a texture map which permits a textured surface to be, in effect, projected on the plane of the polygon thereby to represent a surface pattern.

In building up an image, the various objects within the possible field of view are analyzed sequentially and pixel definitions are output for each screen-space pixel which the object occupies completely or partially. Since it is computationally difficult to order the objects in terms of depth or distance from the viewpoint prior to processing, there is typically provided with each object pixel definition a depth value which represents distance from the viewpoint to the object. The depth values allow control circuitry associated with a depth buffer to determine which objects are nearer the viewpoint should thus control the color and brightness of a given pixel and allows for mixing of colors when objects only partially occupy a pixel and for performing hidden surface elimination. Prior art systems, however, do not provide for the displaying of volumetric effects such as smoke, fog and bomb bursts where the contribution from the effect should depend upon the amount of the affected volume which is in front of any object being viewed and which should also be modified if the viewpoint is within the volumetric effect.

Among the objects of the present invention may be noted the provision of a real time image generation system which enables the displaying of volumetric effects such as smoke, fog and bomb bursts; the provision of such a system which allows the effect to be modified as a function of the distance through the affected volume between the viewpoint and an object being viewed; the provision of such a system which allows the effect to be realistically modified for viewpoints within the affected volume; the provision of such a system which does not require greatly expanded buffer memory; the provision of such a method which is highly reliable and which is of relatively simple and inexpensive implementation. Other objects and features will be in part apparent and in part pointed out hereinafter.

SUMMARY OF THE INVENTION

The method of the present invention is applicable to a real time image generation system in which opaque or planar object pixels are defined by at least a color attribute and a depth value and volumetric pixels are defined by at least a color attribute, a depth value and an opacity gradient value. Volumetric pixel objects are read first and corresponding attributes are stored in a volumetric data buffer. Successive object pixel definitions are then read and, by comparing the depth values of the current object definition with the depth value held in the buffer, a relative weight is calculated for the volumetric effect as a function of the relative depth values and the opacity gradient value. The color attributes from the object color and the buffer are mixed as a function of the relative weighting to obtain a result color attribute which is output as the display color for the respective pixel.

BRIEF DESCRIPTION OF THE DRAWINGS

Corresponding reference characters indicate corresponding parts throughout the several views of the drawings.

DESCRIPTION OF THE PREFERRED EMBODIMENT

As indicated previously, real time image generation systems are utilized for simulation and interactive training. Such systems are, for example, used for training combat tank crews in coordinated tactics and strategies. To provide for realistic interactive training, the image generation system must not only permit the position, orientation and perspective of the viewpoint to change in relation to various objects which may be seen but also should permit the free movement and re-orientation of certain objects being viewed. For example, while the participant at one terminal or station may have control of his own position and viewpoint, e.g. by driving his vehicle, the position and orientation of an object in his view, e.g. another vehicle, may be controlled by personnel at a different terminal or station.

Figure 1:
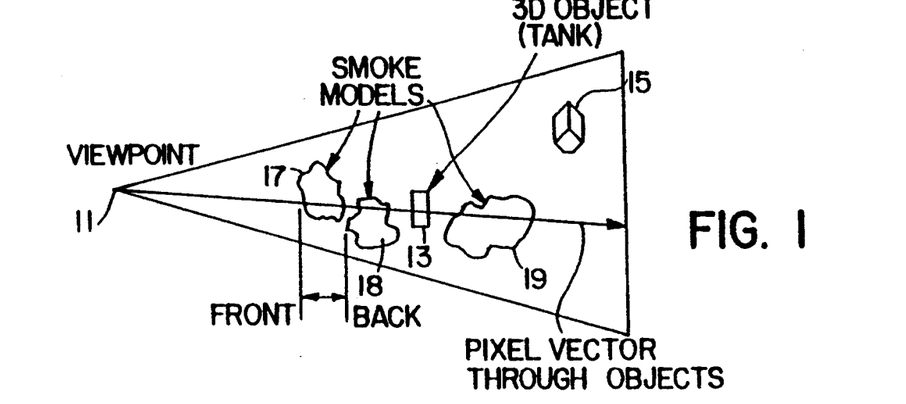
FIG. 1 is a diagram illustrating a viewpoint in the context of an image generation system displaying both solid objects and volumetric items.

With reference to FIG. 1, the viewpoint, designated by reference character 11, may change in both position and orientation with respect to objects within the field of view, e.g. tank 13 and building 15 and, at the same time, the tank 13 may itself move and re-orient itself with respect to stationary objects. Since this freedom implies that any given pixel may change from frame to frame, it becomes essentially necessary to generate a complete image during each frame interval. Further, in order to provide realistic training, it is highly desirable that the view also be able to encompass effects such as smoke, fog and bomb bursts, e.g. as indicated by reference characters 17–19. To be realistic, these effects should exhibit a volumetric behavior in the sense that the amount of the effect should depend upon the depth or distance through the affected volume and should depend also upon whether the viewpoint is within the affected volume.

Figure 2:
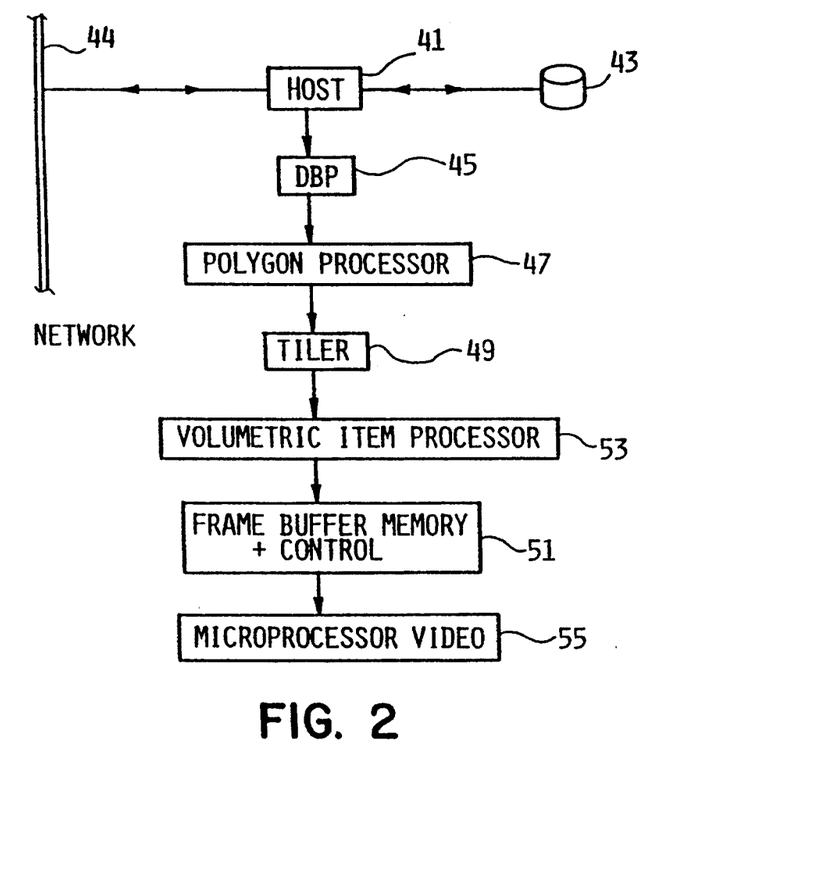
FIG. 2 is a diagram of the architecture for a real time image generation system in which the present invention is useful.

To provide for the repetitive and real time generation of complete images on successive frames, it is usual to employ a combination of general purpose computer systems and dedicated special purpose logic. The general purpose computer systems typically manage the databases of scenes and objects which can be displayed in those scenes and the special purpose hardware accepts re-oriented polygon definitions and texture maps from the general processor computer apparatus and generates definitions for surfaces and for individual pixels. A typical real time image generation system of this character is illustrated in FIG. 2. This system may, for example, be essentially the GT100D visual system as manufactured and sold by the Systems and Technologies Division of Bolt Beranek and Newman of Cambridge, Massachusetts. The embodiment of the present invention being disclosed herein is an improvement in that existing system.

With reference to FIG. 2, the general purpose processing system which manages the training or simulation programs and the databases of scenes and displayable objects is indicated generally by reference character 41. Typically, a Winchester type hard disk drive 43 is provided for storing database information and programs. Multiple simulation systems may be linked through a data network as indicated at 44.

The database is traversed and processed by the database processor 45. The polygons which are used to make up the various displayable objects may, for example, be stored in the database in the form of vertex and attribute information as referenced earlier. This vertex information is then converted to a more complete polygon definition by polygon processor 47. Information provided by the database processor 45 is, in turn, processed by a polygon processor 47 which generates definitions of individual surfaces. Colors and/or textures can then be applied to the individual surfaces by dedicated circuitry 49 which is conventionally referred to as a tiler. As successive objects within the field of view are processed, the tiler outputs corresponding pixel definitions for each pixel which can be affected by that object. The object pixel definitions includes color, a depth value which represents distance from the viewpoint, and a weight value which indicates the degree of pixel coverage. The pixel definitions provided by the tiler for successive objects are combined and accumulated in a frame buffer memory system designated generally by reference character 51. However, in accordance with the practice of the present invention, volumetric effects can be applied to the various object pixel definitions by a volumetric item processor, designated by reference character 53, prior to being applied to the frame buffer system 51, and the database includes volumetric items which are used to load buffers in the volumetric item processor.

During the display of a given frame or image, corresponding locations in the buffer memory 51 are successively read out by a microprocessor video controller 55. As is conventional, the frame buffer memory system 51 provides for double buffering, that is, two sections of memory are provided and one section is used to build up a new image for the next frame while the other section is being read out by the video processor 55.

In the prior art GT100D system, data defining successive object pixels was accumulated in the single memory buffer according to an algorithm which summed partial pixel contributions until full coverage was reached and which used the depth value for the nearest contributing object as the depth value for the accumulated attributes. Once the weight value accumulated corresponded to full coverage, the information in the buffer would be replaced only if a subsequent object was nearer. If a subsequent nearer object was of less than full coverage, the new and stored parameters were combined using the new weight for its color and full minus the new weight for the previous color value. Preferably, however, the volumetric item processor of the present invention is used in conjunction with a novel depth buffering system which is the subject of a separate co-assigned U.S. patent application Ser. No. 07/741,999 entitled "Anti-Aliasing Depth Buffering" which is filed of even date with the present application. The disclosure of said copending application is incorporated herein by reference. As is described in greater detail in said copending application, each section of the frame buffer memory implements two buffers, a so-called partial buffer and a so-called full buffer, so as to minimize bleed through effects.

Figure 3:
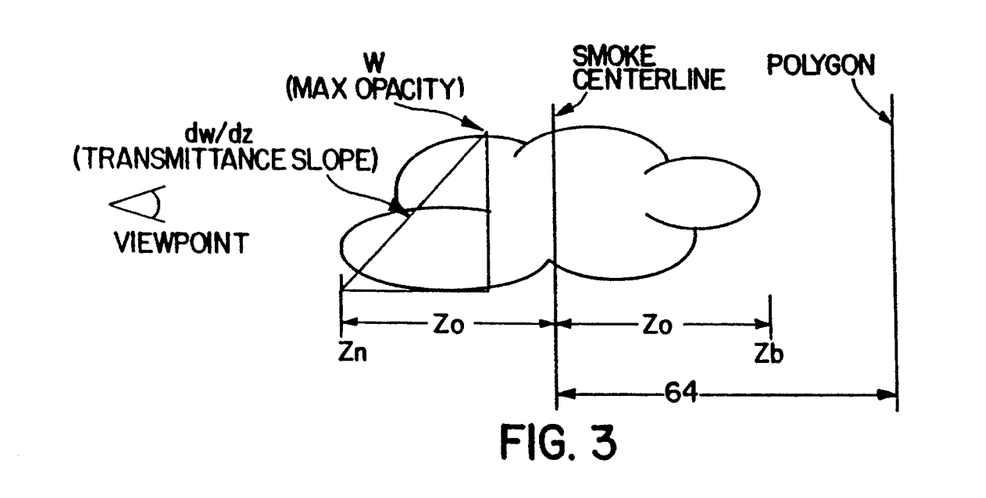
FIG. 3 is a diagram illustrating parameters of a volumetric effect in accordance with the present invention.

In accordance with the present invention, the database can encompass two different types of items. As in the prior art GT100D system and as described in greater detail in said copending application, the database will include definitions of opaque or planar objects and the data representing those objects will include a 16-bit depth value (Z), a three-bit priority value (P) which can be used for resolving certain depth ambiguities, four-bit values (R, G & B) for the brightness of each of the primary colors red, green and blue, and a four-bit weight value (W) which indicates the degree of coverage of the pixel by the new object being presented. In addition to opaque or planar items or objects, the database will, in accordance with the present invention, also include volumetric items. The data representing the volumetric items encompasses the same number of bits as the planar objects but the bits are differently mapped. In one particular implementation, 12 bits are used for color, four for each of the three primary colors as in the solid object but depth is represented by only a 12-bit value so that depth positions are represented with lower resolution (less precision) than with solid objects. For ease in performing certain calculations, the depth value used in the embodiment illustrated is not the depth to the center or even one edge of the affected volume but, rather, is to an arbitrary reference point, the center of the affected volume being assumed to be a fixed distance in front of the stated depth. This arrangement is illustrated in FIG. 3. In the particular embodiment illustrated, the fixed offset is assumed to be 64 units, typically meters, from the stated depth. In addition to depth, there is a depth offset Zo which represents, in one sense, the radius of the volumetric effect, i.e. a distance from the smoke center line to the front or back of the item. Four bits are used to represent a value which may be considered an opacity gradient. The maximum opacity of the effect, also referred to herein as its weight, is calculated as a function of the opacity gradient and the effect radius or offset. The opacity gradient value in effect represents how quickly the volumetric effect progresses towards its maximum opacity as the length of the line of sight through the effect increases. The data stored in the database also includes a bit which indicates whether a particular item is a solid object or a volumetric item.

Figure 4:
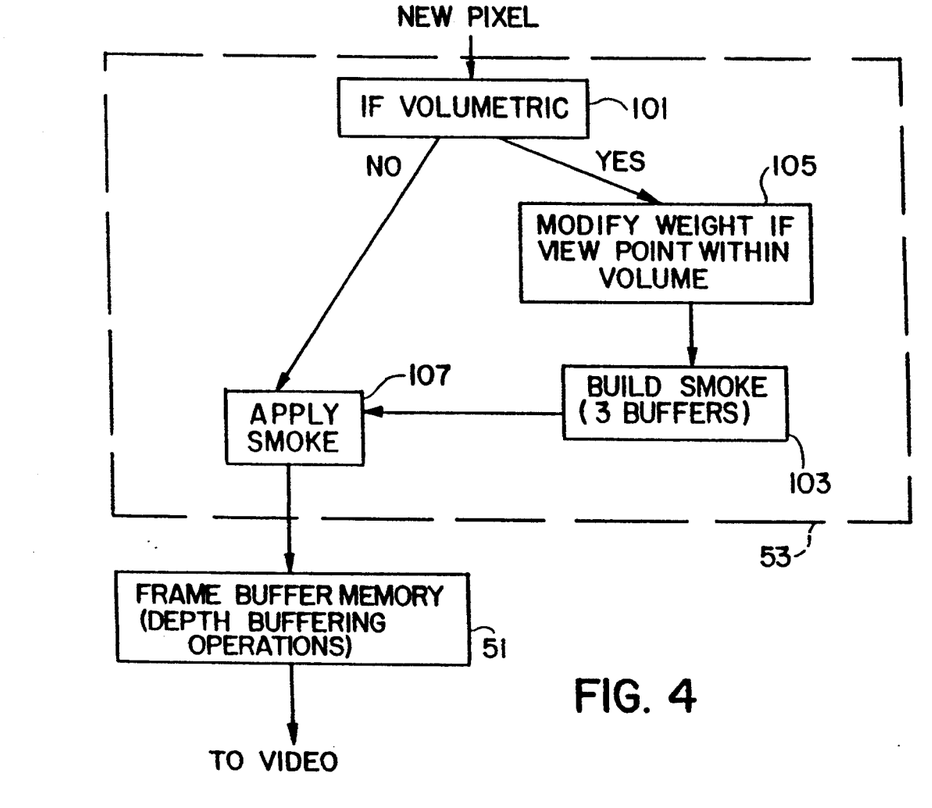
FIG. 4 is a block diagram illustrating logic for producing volumetric effects such as smoke in accordance with the present invention.

The general organization of the volumetric item processor 51 is illustrated in FIG. 4. As indicated previously, volumetric items are read out first from the database. If the item being read is determined to be volumetric, as tested at block 101, its effect is accumulated in a buffer. This general procedure is described herein as "building" smoke. An appropriate section of buffer memory is indicated at block 103. As described in greater detail hereinafter, three separate frame buffers are provided for accumulating volumetric effects. As also described in greater detail hereinafter, the contributions from the successive volumetric items on a given pixel are accumulated in accordance with respective weight values. However, if the viewpoint is within the affected volume for a given volumetric item, the weight for that item must be adjusted. This operation is indicated generally at block 105.

After all of the volumetric items have been read out of the database, planar object definitions are passed through the volumetric item processor, where volumetric effects are applied to modify the pixel characteristics as indicated at block 107, and are then passed on to the frame buffer memory system 51 after volumetric effects are applied. This modifying process is conveniently referred to herein as "applying" smoke.

Figure 5:
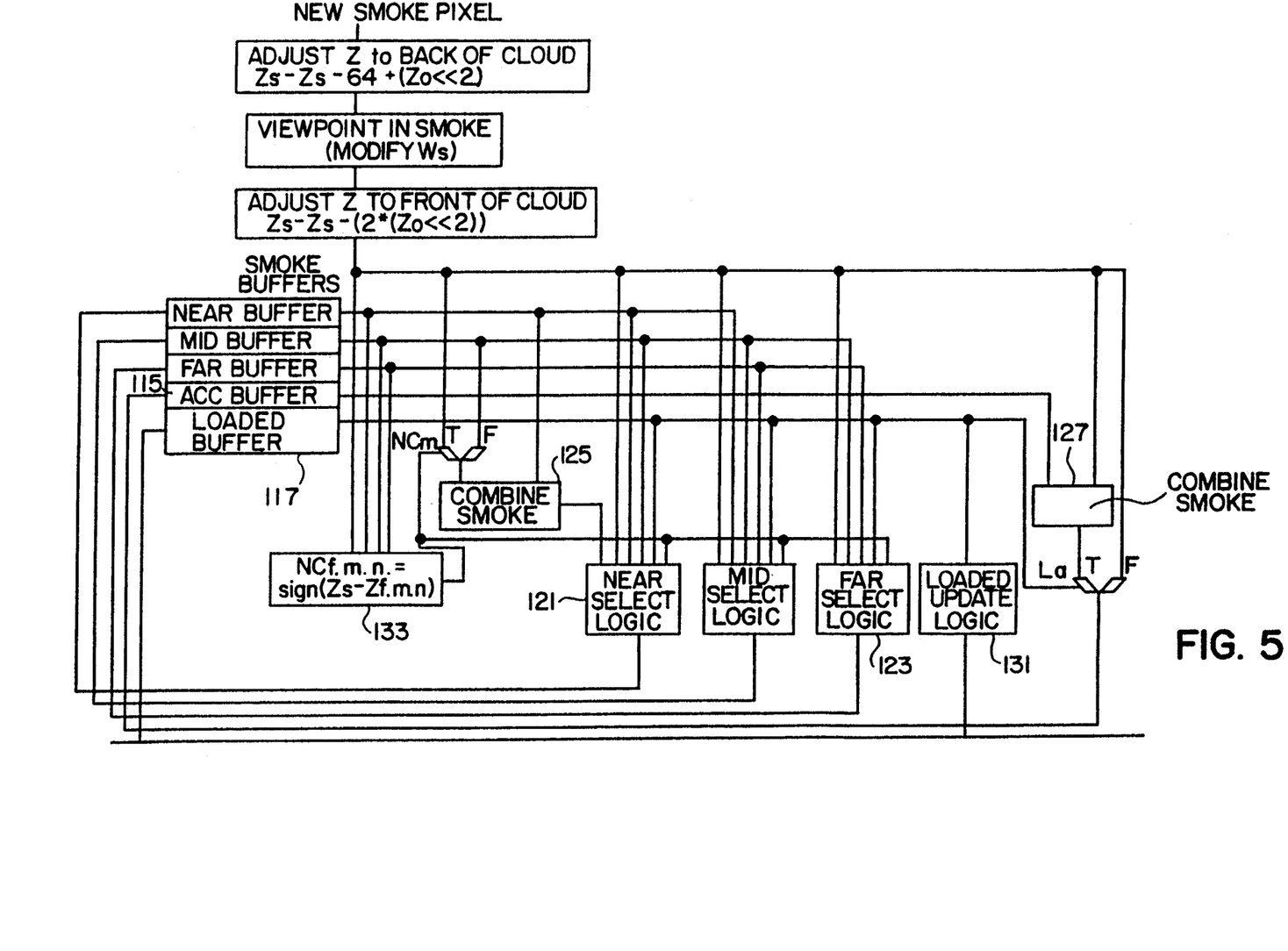
FIG. 5 is a block diagram of logic for cumulating or building volumetric effects which is incorporated in the system of FIG. 4.

The general organization of the build smoke logic is illustrated in FIG. 5. As indicated previously, three buffers, designated by reference characters 111–113 are provided for storing volumetric item defining data. These buffers are conveniently designated as the near, mid and far buffers, respectively. The logic also employs a buffer 115 for accumulating values and a buffer 117 for storing data indicating which buffers contain valid data. In general, the first volumetric item encountered is loaded into the near buffer. Subsequent entries are compared with any existing entries and the entries are sorted for loading into the appropriate buffers based on their respective depth values. This sorting is performed by the near, mid and far select logic arrays designated by reference characters 121–123

Figure 6:
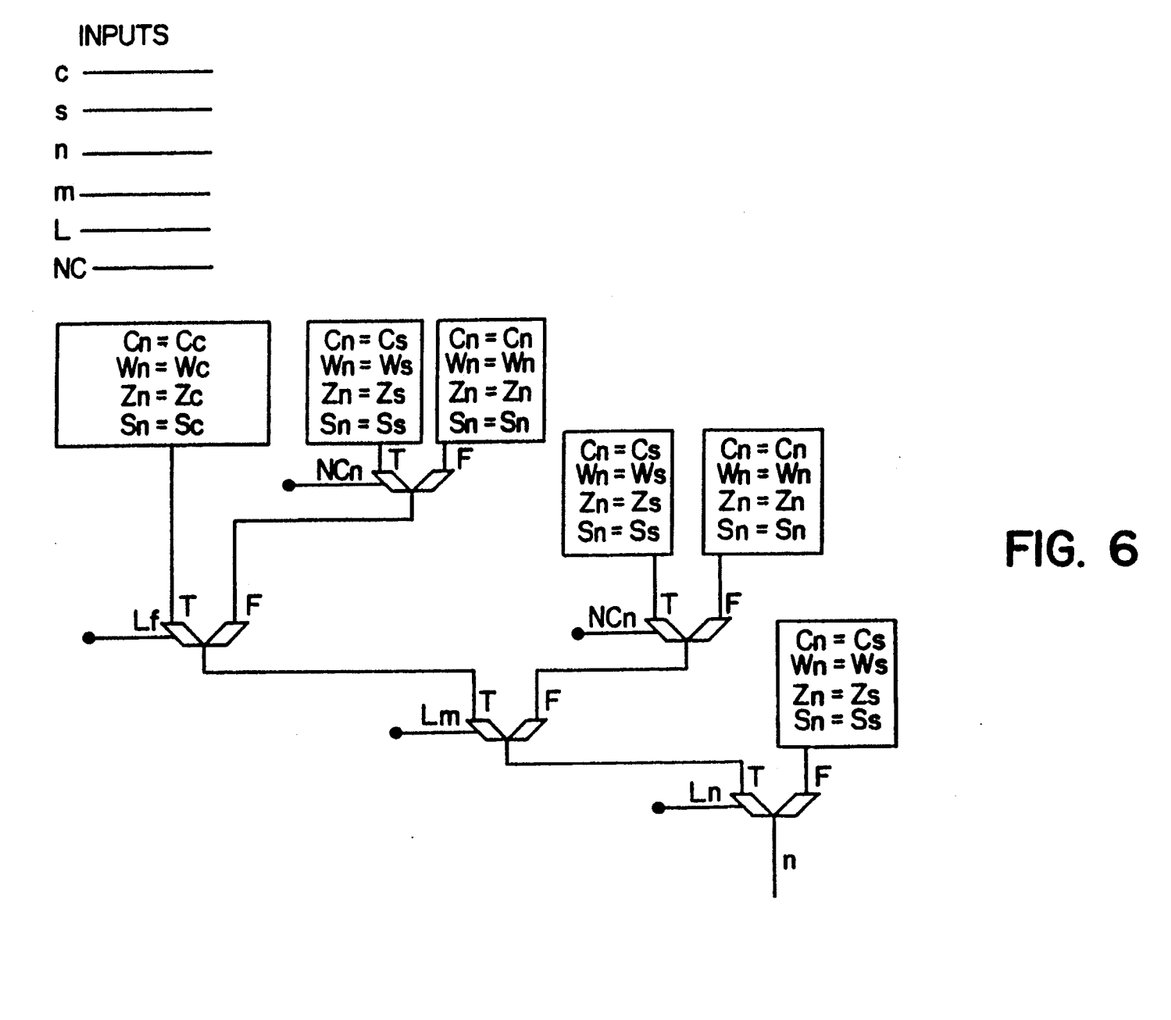
FIGS. 6–11 are diagrams illustrating in greater detail portions of the logic of FIG. 5.
Figure 7:
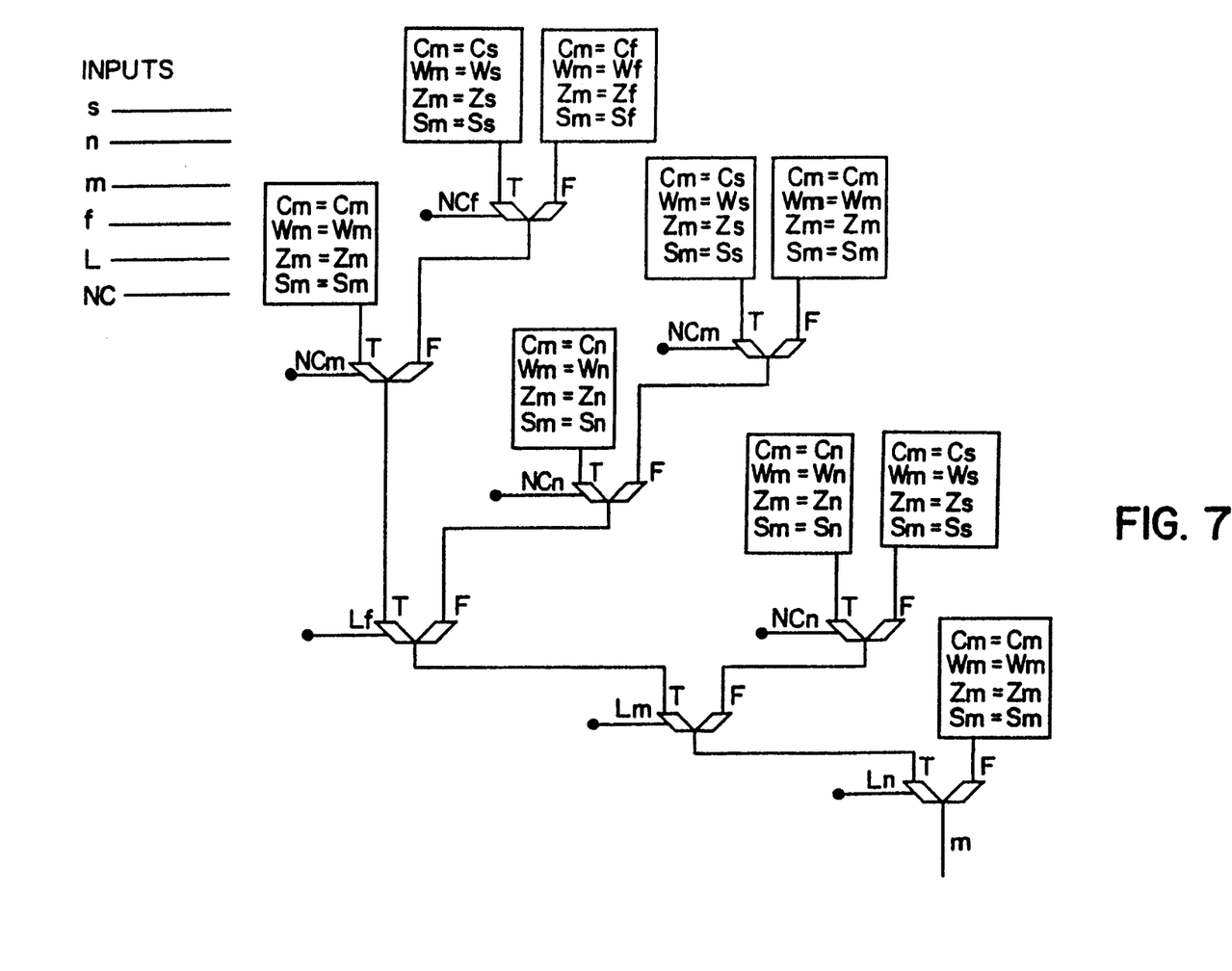
Figure 8:
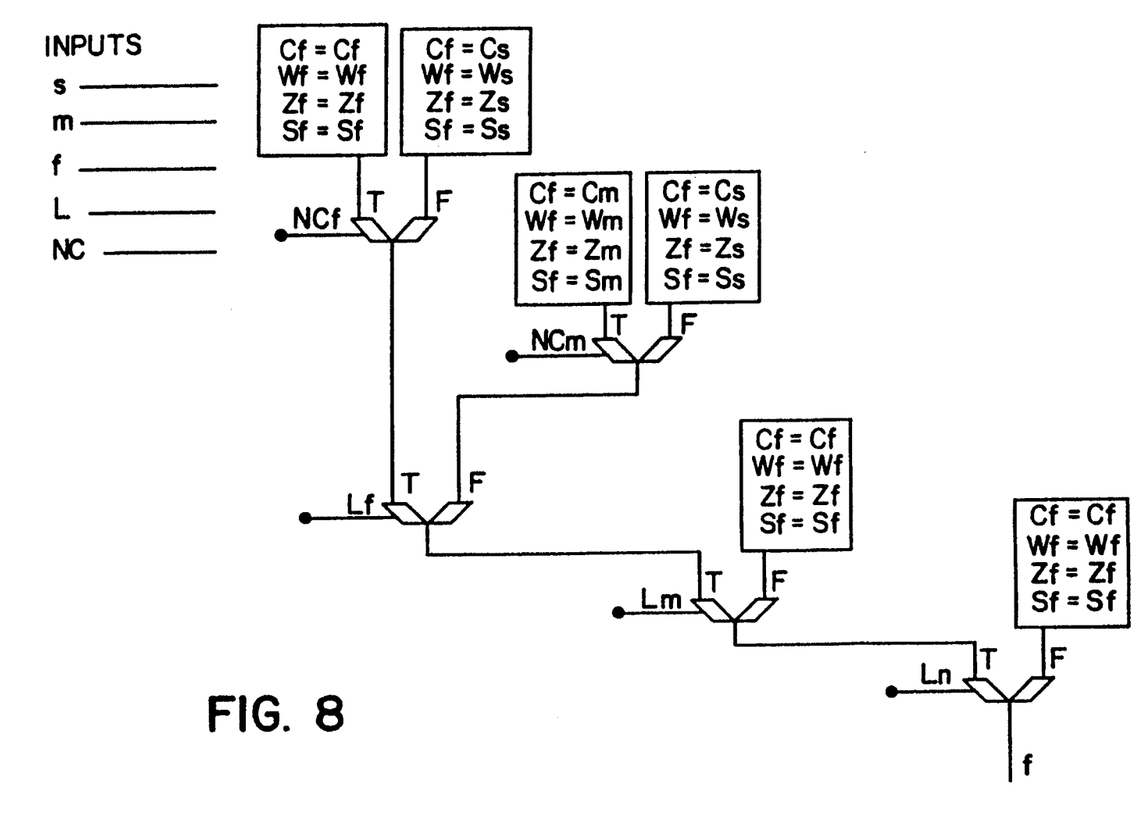
Figure 9:
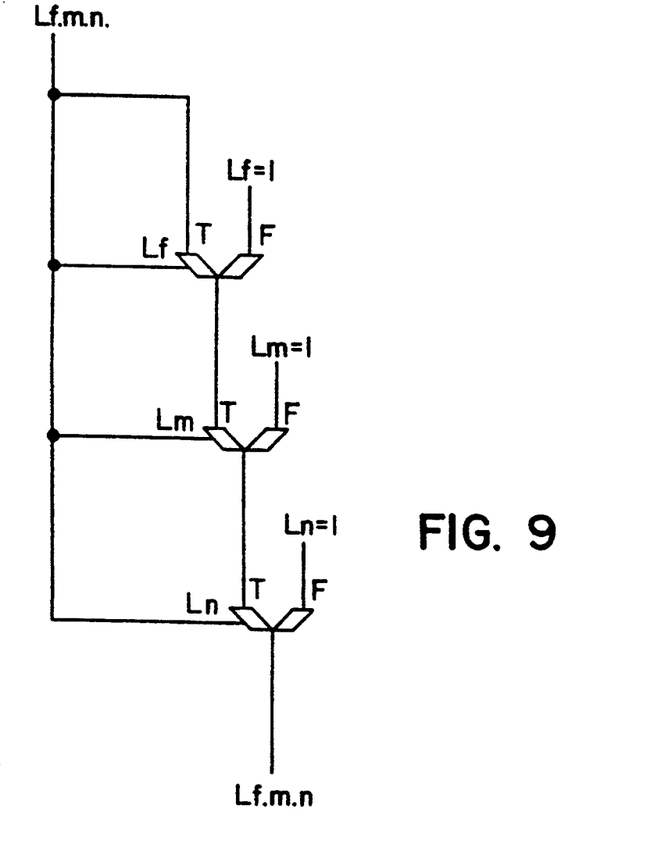

If more than three volumetric items are applicable to a given pixel, the nearer two are combined and cumulative values are loaded into the near buffer. If the new entry is nearer than the value currently in the mid buffer, the new and near are combined by the logic as indicated at block 125 whereas if the new entry is further than the mid, the near and mid are combined by the logic indicated at block 125. The logic for updating the loaded buffer 117 is indicated generally by reference character 131 while the logic for detecting depth ordering is indicated generally at block 133. The logical operations performed by the near, mid and far sorting logic components are illustrated in greater detail in FIGS. 6–8 which include legends identifying the sources of the various signals being logically combined. The detailed implementation of the logic 133 for updating the loaded buffer is similarly illustrated in greater detail in FIG. 9.

Figure 10:
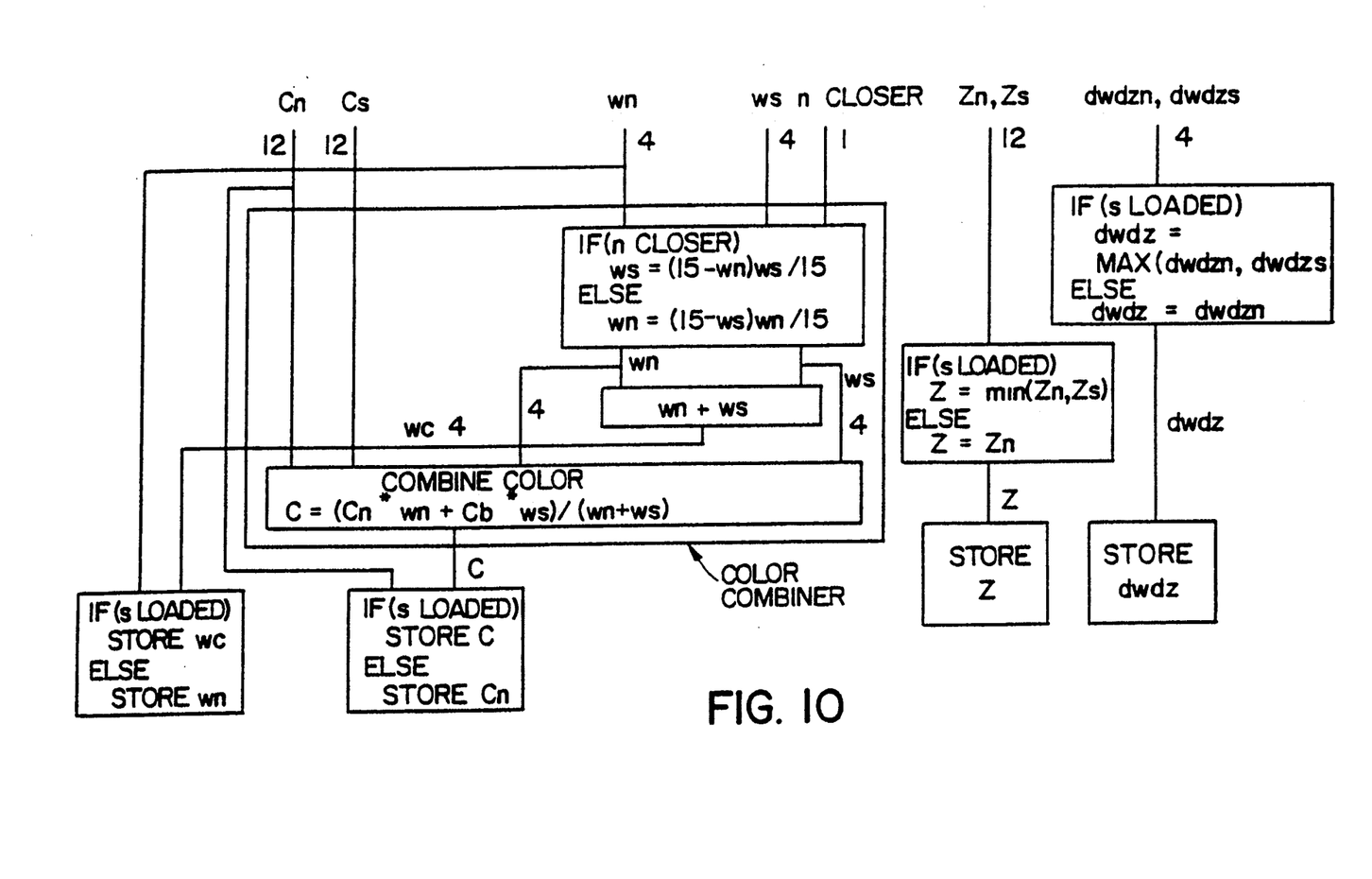

As indicated previously, if more than three volumetric items are applicable to a given pixel, entries must be combined. The detailed logic for effecting such combination in accordance with one implementation of the present invention is shown in FIG. 10. This logic effects combination in essentially the following manner. The combined smoke depth value is simply the nearer of the two depth values. This in effect represents the logical front edge of the combined smoke clouds. The opacity gradient (dw/dz) is the greater of the two smoke clouds. Using the greater slope avoids the problem which would occur if the gradient of the nearer item were used and were a low value which could, in effect, cause a sort of X-ray vision through the more distance cloud. The combined weight or transmittance value is calculated essentially according to the following formula.

$$W_{combined} = W_{nearer} + (1 - W_{nearer})(W_{further})$$

Figure 11:
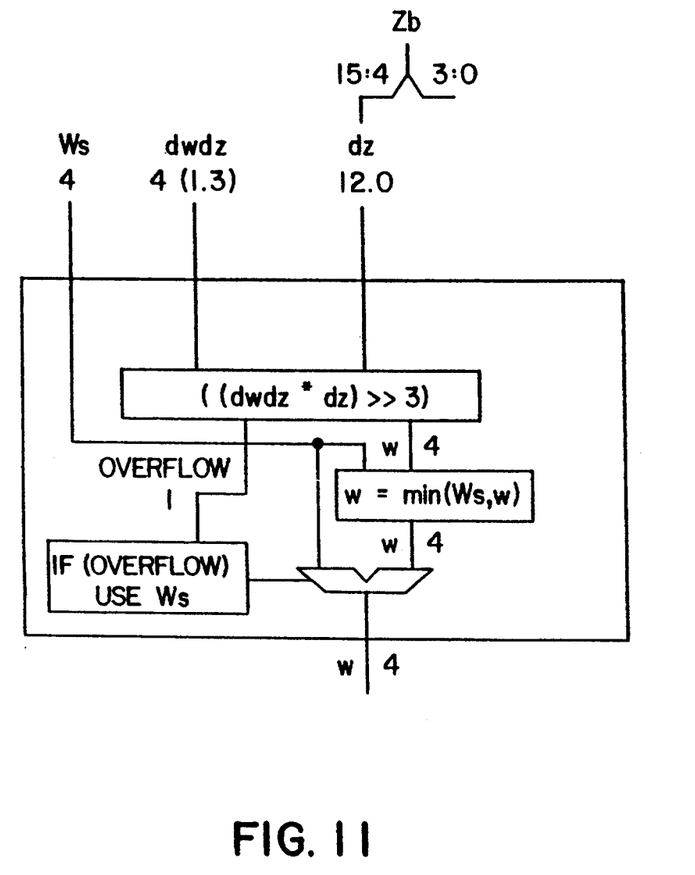
Figure 12:
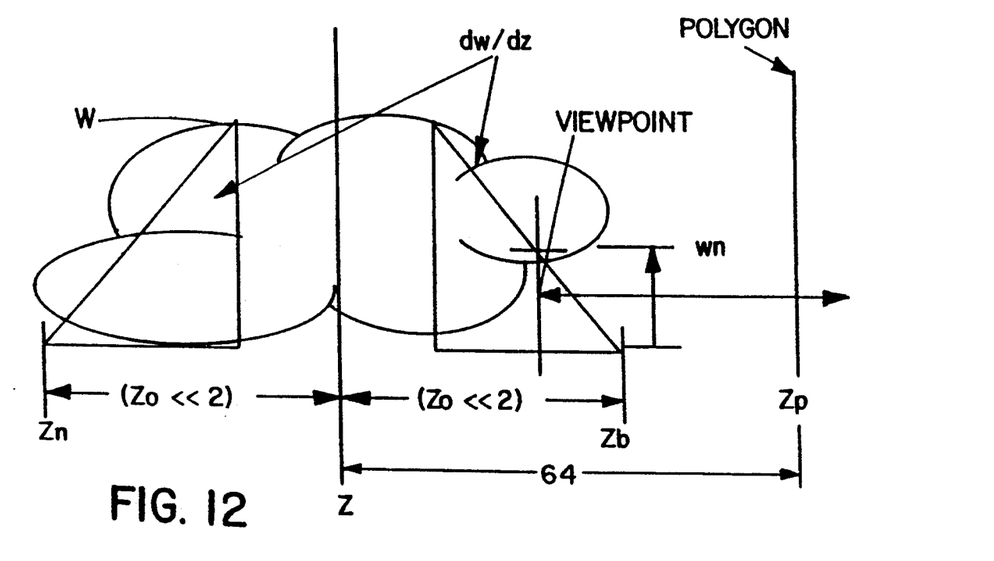
FIG. 12 is a diagram illustrating parameters for a volumetric effect when the viewpoint is within the effect.

As indicated previously, it is desirable to allow for viewpoints within a volumetric effect or smoke cloud and, to realistically obtain such an effect, the weight of the volumetric effect must be modified as indicated at block 105 in FIG. 4. The detailed logic for effecting this modification is illustrated in greater detail in FIGS. 5 and 11. Essentially this logic determines the width of smoke still in front of the viewpoint and this magnitude is multiplied by the weight slope or opacity gradient (dw/dz) to derive the amount of weight which the viewer is still looking through. This is illustrated diagrammatically in FIG. 12.

Figure 13:
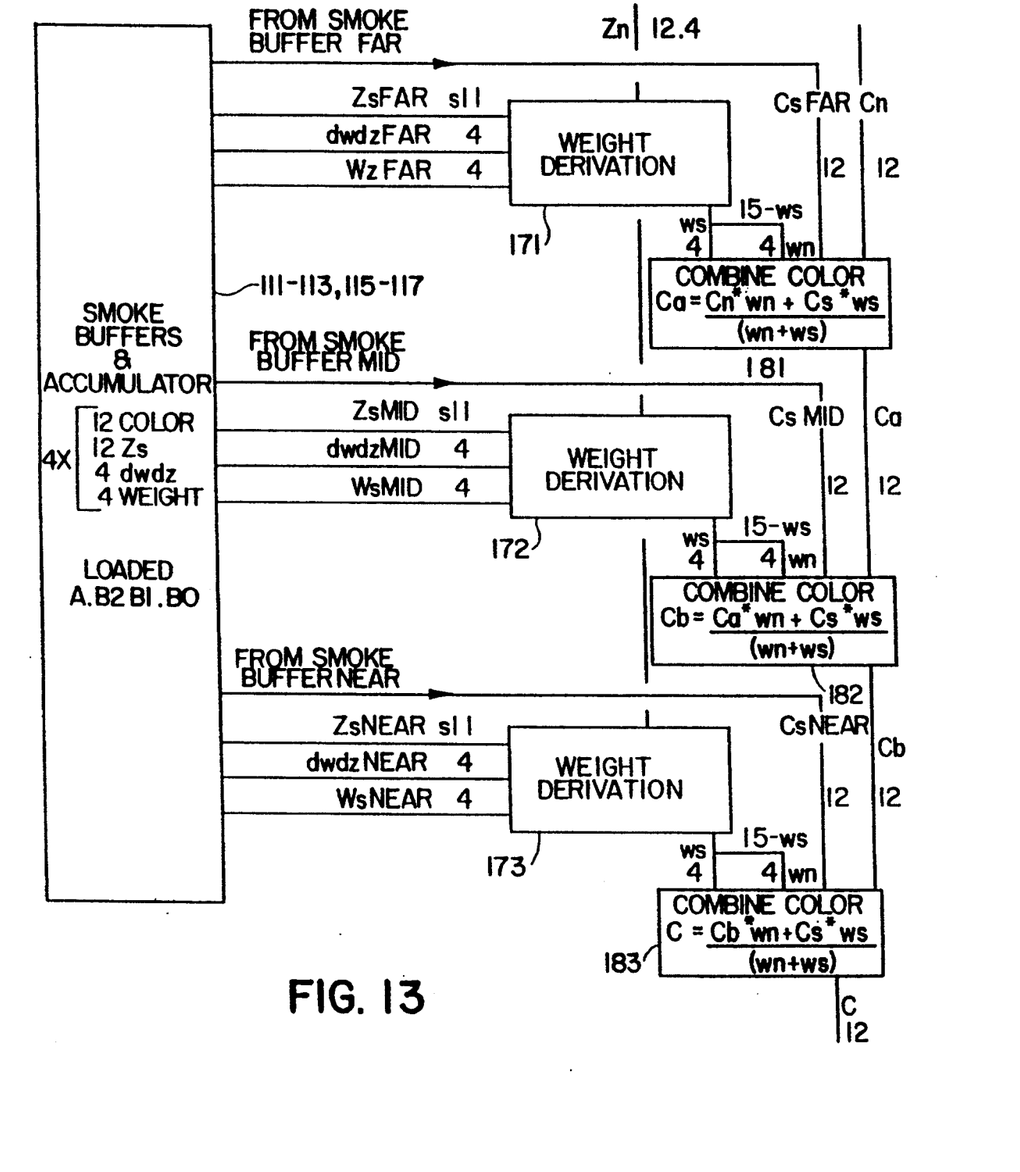
FIG. 13 is a block diagram illustrating logic for applying of volumetric effects which is utilized in the system of FIG. 4.
Figure 14:
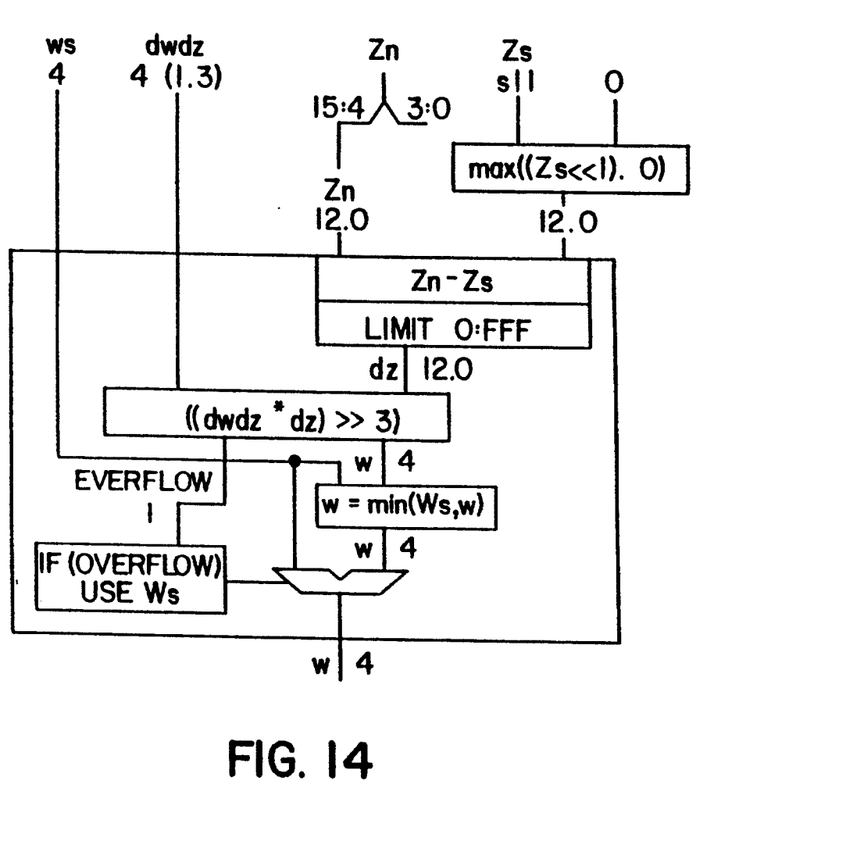
FIG. 14 is a block diagram illustrating in greater detail portions of the logic of FIG. 13.

The general organization of the logic which effects the application of smoke, as indicated at block 107 in FIG. 3, is illustrated in FIG. 13. A weight derivation is performed on the data held in each of the three buffers, i.e. the near, mid and far buffers, as indicated at blocks 171–173 and then the effect of each of the volumetric items is applied successively to and combined with the data representing each new planar object pixel definition, proceeding from back to front as indicated at blocks 181–183. The logic functions implemented by each of the weight derivation blocks 171–173 is illustrated in greater detail in FIG. 14. The combined effect of these operations is essentially as follows. The applying of smoke is a series of linear interpolations between each smoke color and the new object pixel color. The weight of the smoke in front of the current object pixel depth, as determined by the weight derivation, determines the ratio of smoke to object pixel color for each interpolation, i.e. the smoke interpolation weight is modified if the object falls inside the affected volume. This allows a smooth transition through smoke clouds as desired. The three smoke entries for each pixel are applied back to front to allow proper smoke coloration. For each smoke entry, two things occur. First, the object pixel depth is used to determine if the non-smoke pixel entry is within the smoke clouds. If it is, the maximum weight is reduced to the depth difference multiplied by the weight slope (dw/dz). This weight value is used in the second operation which is the color interpolation. The weight value which feeds into the color combination determines the mix of smoke to object pixel color for each entry.

As will be understood from the foregoing description, the method and apparatus of the present invention allows for the realistic incorporation of volumetric effects, such as smoke, into a real time image generation system. The system allows for both objects being viewed and the viewpoint to be within the volume affected by a given volumetric effect and, likewise, allows smooth transitions as viewpoint or object move out of that volume. Further, the system allows for multiple volumetric effects to operate on each pixel in the view.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a real time image generation system operating from polygon defined surface data in which opaque object pixels are defined by at least a color attribute and a depth value and in which volumetric pixel items are defined by at least a color attribute, a depth value, an opacity weight and an opacity gradient value, a hardware implemented method for generating volumetric effects comprising:

reading successive volumetric pixel items and storing in a data buffer a color attribute, a depth value, an opacity weight value, and an opacity gradient value characterizing volumetric effects applicable to each pixel;

reading successive object pixel definitions;

comparing the depth value of the current object definition with the depth value held in said buffer and calculating, as a function of the relative depth values and the corresponding opacity gradient and weight values, a relative weight to associate with the corresponding color attribute in the buffer;

mixing the object color attribute and the color attribute from said buffer as a function of said relative weighting to obtain a result color attribute which is output as the color for the respective pixel.

2. The method as set forth in claim 1 wherein the volumetric pixel items are further defined by a value which represents the depth size of the volumetric effect, wherein said depth values are determined with respect to a viewpoint, and wherein said method further comprises adjusting the weight of each volumetric item which encompasses the viewpoint, the adjusted weight being proportional to the depth of volumetric effect which is beyond the viewpoint.

3. The method as set forth in claim 1 wherein the volumetric pixel items are further defined by a value which represents the depth size of the volumetric effect, wherein said depth values are determined with respect to a viewpoint, and wherein said relative weight is equal to the respective capacity weight if the object is beyond the volumetric effect and is adjusted as a function of the respective opacity gradient and depth of affected volume in front of the object if the object is within the effect.

4. In a real time image generation system operating from data in which opaque object pixels are defined by at least a color attribute and a depth value and in which volumetric pixel items are defined by at least a color attribute, a depth value, an opacity weight and opacity gradient value, a hardware implemented method for generating volumetric effects comprising:

providing memory means constituting at least a near volumetric data buffer and a far volumetric data buffer, each of said volumetric data buffers being adapted to hold a color attribute, a depth value, an opacity weight value, and an opacity gradient value, the values for each buffer together comprising an entry; reading successive volumetric pixel items;

comparing the depth value of each new volumetric pixel item with any existing depth values stored in said buffers and ordering the new and existing entries in said buffers in depth order;

reading successive object pixel definitions;

comparing the depth value of the current object definition with a depth value held in said far buffer and calculating, as a function of the relative depth values and the corresponding opacity gradient and weight values, a relative weight to associate with the corresponding color attribute in the far buffer;

mixing the object color attribute and the color attribute from said far buffer as a function of said relative weighting to obtain an intermediate color attribute;

comparing the depth value of the current object definition with a depth value held in said near buffer and calculating, as a function of the relative depth values and the corresponding opacity gradient and weight values, a second relative weighting to associate with the color attribute in the near buffer;

mixing said intermediate color attribute and the color attribute from the near buffer as a function of said second relative weighting, thereby to obtain a result color attribute.

5. In a real time image generation system operating from polygon defined surface data in which opaque object pixels are defined by at least a color attribute and a depth value and in which volumetric pixel items are defined by at least a color attribute, a depth value, an opacity weight and an opacity gradient value, apparatus for generating volumetric effects comprising:

memory means providing a predetermined number of volumetric data buffers, each of said volumetric data buffers being adapted to hold a color attribute, a depth value, an opacity weight value, and an opacity gradient value, the values for each buffer together comprising an entry, the buffers being ordered with respect to depth;

means for reading successive volumetric pixel items; means for comparing the depth value of each successive volumetric pixel item with any existing depth values stored in said buffers and ordering and storing the new and existing entries in said buffers in depth order;

means for reading successive object pixel definitions;

means for comparing the depth values of each successive object definition with the depth value held in each of said buffers proceeding form distant to near and calculating for each buffer as a function of the relative depth values and the respective opacity gradient and weight values, a relative weight to associate with the corresponding color attribute in that buffer and mixing the object color attribute and the color attribute from that buffer as a function of the respective relative weighting to obtain successive color attributes.

6. Apparatus as set forth in claim 5 including means for combining the effects of successive volumetric pixel items when the number of volumetric pixel items exceeds the predetermined number of data buffers.

7. Apparatus as set forth in claim 5 wherein the volumetric pixel items are also defined by a value which represents the depth size of the volumetric effect, wherein said depth values are determined with respect to a viewpoint, and wherein said apparatus further includes means for determining whether the viewpoint is within the volumetric effect and means for adjusting the weight value of the volumetric item prior to storing in a buffer, the adjusted weight being proportional to the depth of volumetric effect which is beyond the viewpoint.

8. In a real time image generation system operating form polygon defined surface data in which opaque object pixels are defined by at least a color attribute and a depth value and in which volumetric pixel items are defined by at least a color attribute, a depth value, an opacity weight and an opacity gradient value, apparatus for generating volumetric effects comprising:

means for storing in a data buffer a color attribute, a depth value, an opacity weight value, and an opacity gradient value characterizing the volumetric effects applicable to each pixel;

means operative as successive object pixel definitions are read for comparing the depth values of the current object definition with the depth value held in said buffer and calculating, as a function of the relative depth values and the corresponding opacity gradient and weight values, a relative weight to associate with the corresponding color attribute in the buffer;

means for mixing the object color attribute and the color attribute from said buffer as a function of said relative weighting to obtain a result color attribute which is output as the color for the respective pixel.

* * * * *

UNITED STATES PATENT AND TRADEMARK OFFICE
CERTIFICATE OF CORRECTION

PATENT NO. : 5,339,386

DATED : August 16, 1994

INVENTOR(S) : Brian T. Soderberg; and Mark L. Kenworthy

It is certified that error appears in the above-identified patent and that said Letters Patent is hereby corrected as shown below:

Claim 3, Column 7, line 57, "capacity" should be --opacity--.

Claim 3, Column 7, line 58, after "effect", insert --relative the view point--.

Claim 5, Column 8, line 58, "form" should be --from--.

Claim 8, Column 9, line 17, "form" should be --from--.

Signed and Sealed this

Twelfth Day of December, 1995

Attest:

BRUCE LEHMAN

*Attesting Officer*

Commissioner of Patents and Trademarks